United States Patent [19]

Holmes

[11] 4,235,948

[45] Nov. 25, 1980

[54] SIMULATED STONE ARTICLE AND METHOD FOR MAKING SAME

[75] Inventor: Donald F. Holmes, Houston, Tex.

[73] Assignee: Royal Marble Company, Inc., Houston, Tex.

[21] Appl. No.: 25,996

[22] Filed: Apr. 2, 1979

[51] Int. Cl.³ .......................... B44F 7/00; B05D 1/36
[52] U.S. Cl. ..................... 428/15; 427/204; 428/35; 428/325; 428/431
[58] Field of Search .................. 428/15, 431, 35, 325; 427/204

[56] References Cited

U.S. PATENT DOCUMENTS

| | | | |
|---|---|---|---|
| 3,562,379 | 2/1971 | Duggins | 428/15 X |
| 3,582,388 | 6/1971 | Stayner | 428/431 X |
| 3,711,581 | 1/1973 | Fowler et al. | 428/35 X |
| 3,773,886 | 11/1973 | Starr et al. | 428/15 X |

*Primary Examiner*—Thomas J. Herbert, Jr.
*Attorney, Agent, or Firm*—Darryl M. Springs

[57] ABSTRACT

In one exemplar embodiment a simulated stone article having a pre-formed acrylic sheet "skin" is integrally bonded to a simulated stone matrix layer. The surface of the acrylic "skin" is cleaned with an inert organic solvent to make the surface more receptive to molecular bonding. A coat of urethane is applied to the acrylic "skin" surface and permitted to cure. The simulated stone matrix is a composition including a catalyzed polyester bonding resin, a simulated stone aggregate mix, coloring, veining and pigmentation agents and an exothermic reducing agent for slowing the setting time and lowering the temperature of the bonding resin for permitting greater flexing of the composition during shrinkage of the resin while curing for improving the bond between the acrylic "skin" and cured urethane, and the bonding resin of the simulated stone matrix.

15 Claims, 4 Drawing Figures

U.S. Patent     Nov. 25, 1980     4,235,948
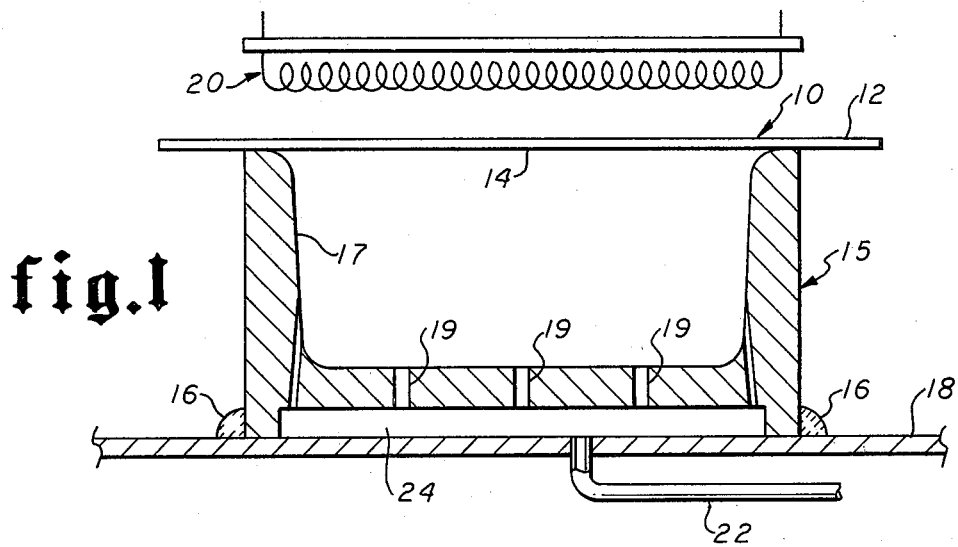
fig.1
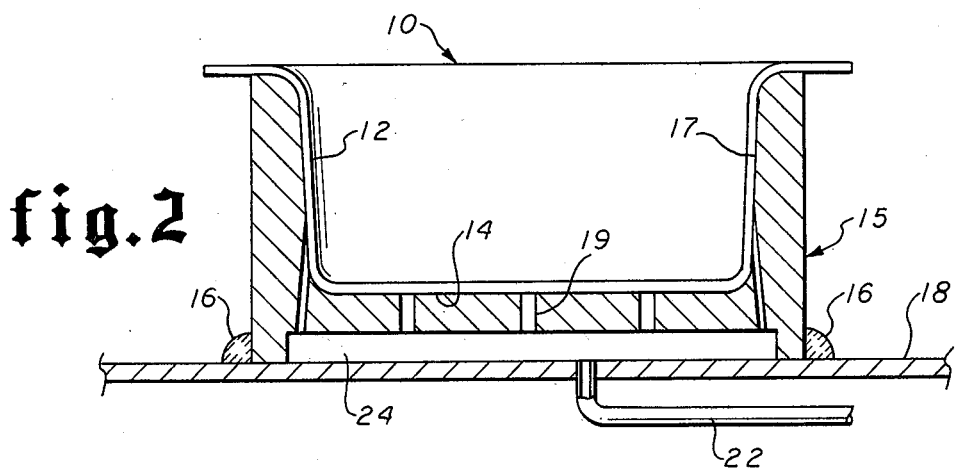
fig.2
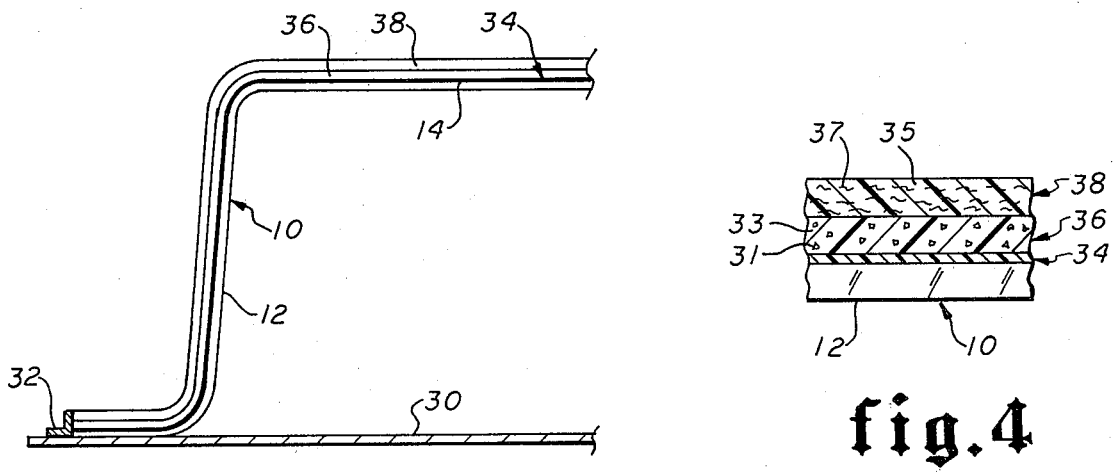
fig.3
fig.4

SIMULATED STONE ARTICLE AND METHOD FOR MAKING SAME

BACKGROUND OF THE INVENTION

This invention relates to a novel article of simulated stone and a process for forming the simulated stone article.

In the processes which are presently employed for forming cultured or synthetic marble or onyx, a colored veining material, such as a pigment mixed with a polyester resin, is added to a mixer containing a highly filled polyester resin which forms the matrix material for the marblized product. The materials are then mixed to produce a random mixing of the colored veining material within the filled matrix material, and the mixture is poured from the mixer into a suitable mold which has previously been coated with a gel coat of a selected polyester resin to act as the surface of the synthetic stone product. The above mixtures are cured to form the finished marblized product. The above described prior art procedure is illustrated by U.S. Pat. Nos. 3,562,379 and 3,433,860.

In addition, there are other techniques for forming a simulated marble product utilizing a multi-step process of forming the colored veining patterns within the simulated stone product such as that described in U.S. Pat. No. 3,773,886. Further, such simulated stone products or synthetic resin sheets are often backed by a rigidified synthetic resin pregnated with glass fibers or other materials for adding strength and rigidity to the product, as is illustrated in U.S. Pat. Nos. 3,813,706 and 3,582,388. Other products which are formed using synthetic resins and as foamed plastics are disclosed in U.S. Pat. Nos. 3,711,581 and 3,673,617.

However, the prior art utilizes expensive molds which are tied up quite often for several hours at a time during the process of making a single simulated stone product. Mold preparation for making each product, such as polishing, gel-coat application, and the like is time consuming and often just the preparation of the mold itself for the process of making the product can take 1½ hours or more per mold. Previously, some attempts have been made to form a simulated stone product directly onto sheets of formed synthetic resins. However, these attempts have not heretofore been successful because of delamination problems between the synthetic sheet and the simulated marble matrix layer. This is probably a result of the shrinkage properties of the polyester bonding resin in the simulated stone matrix. When the resin sets and cures, it may shrink by a factor of 10% or more and this large amount of shrinkage can put excessive stresses into the bond interface between the simulated stone matrix and the synthetic resin sheet that causes buckling, delamination and fracturing of the bond between the simulated stone matrix layer and the synthetic resin sheet causing undesirable effects.

U.S. Pat. No. 3,582,388 discloses a process of depositing glass fibers and a polyester bonding resin onto the surface of a synthetic resin material. The disclosed mixture, including an organic solvent diluent which renders the surface of the sheet more receptive to the polyester resin and promotes molecular adhesion between the bonding resin and the sheet, also contains finely divided siliceous particles in the polyester resin matrix for helping to distribute stresses in the cured resin. However, the process disclosed therein does not address or solve the bonding problem between a simulated stone matrix composition and the surface of a synthetic resin sheet, and does not overcome the delamination problems generally occuring therein.

SUMMARY OF THE INVENTION

The present invention remedies the problems of the prior art by providing a novel simulated stone article and a process for making or manufacturing the same, and is directed to an improved method of bonding a composition containing a catalyzed polyester bonding resin and a simulated stone aggregate to a pre-formed acrylic sheet. In the practice of the present invention, a thin acrylic sheet is pre-formed into an acrylic "skin" by a conventional vacuum molding process. The acrylic "skin" acts as a mold or jig for the making of the article and becomes an integral part (the surface thereof) and provides a hard, durable scratch resistant surface. The surface of the pre-formed acrylic "skin" that is to receive the simulated stone matrix is first washed and cleaned with an inert organic solvent that cleans the surface of the "skin" and also renders the surface of the acrylic sheet more receptive to molecular bonding. A selected urethane composition is applied to the surface of the acrylic "skin" and allowed to cure for a predetermined time period.

The simulated stone matrix composition comprises a catalyzed polyester bonding resin, a simulated stone aggregate, pigmenting agents, and a selected exothermic reducing agent. The composition is mixed in a mixer and applied to the urethane layer coating the surface of the acrylic "skin." The exothermic reducing agent causes a slowing of the setting rate and a lowering of the temperature of the polyester bonding resin for permitting greater flexing of the resin during shrinkage while curing, thus improving the molecular bonding between the resin and the surface of the urethane layer coating the acrylic "skin." After the simulated stone matrix material has partially cured, a composition comprising glass fibers and a suitable curable bonding resin may be sprayed onto the surface of the simulated stone material for adding further rigidity and strength to the final product.

Utilizing the present invention and pre-formed acrylic sheet "skins" makes it possible to use a relatively thin acrylic sheet to make a product rather than a much more expensive thick sheet of acrylic resin, while improving the physical properties of the final product, and dramatically cutting the production cost of manual production of such simulated stone articles using the mold-gel coat-simulated stone matrix procedure of the prior art. The present invention is applicable to the manufacture of a large variety of articles such as bathtubs, shower stalls, lavatories and counter tops, containers, furniture facings, and other applications where a simulated stone product having a hard, durable, weather resistant surface is desirable and/or a principal consideration.

Accordingly, one primary feature of the present invention is to provide a simulated stone article having a pre-formed acrylic sheet "skin" that becomes an integral part of the finished product.

Another feature of the present invention is to provide an article having a pre-formed acrylic sheet "skin" and a simulated marble or onyz patterned matrix that is bonded to the acrylic "skin" to become an integral product.

In another feature of the present invention is to provide a method for making a simulated stone article that has an integral pre-formed acrylic sheet "skin" and a simulated stone composition including a curable polyester bonding resin and a simulated stone aggregate that securely bonds to the acrylic "skin" to resist delamination.

Still another feature of the present invention is to provide a method for making a simulated stone product utilizing a pre-formed acrylic sheet "skin" and a layer of simulated stone matrix material bonded to an intervening layer of cured urethane coating the acrylic "skin," the matrix material containing an exothermic reducing agent for slowing the setting time of the polyester bonding resin therein to improve the bonding between the urethane layer coating the acrylic "skin" and the simulated stone matrix.

BRIEF DESCRIPTIONS OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specificiation. It is to be noted, however, that the appended drawings illustrate only typical embodiments of the invention and therefore are not to be considered limiting of its scope for the invention may admit to further equally effective embodiments.

In the drawings:

FIG. 1 is a schematic view of a typical vacuum molding apparatus which may be employed in the practice of the present invention.

FIG. 2 is another schematic view of the vacuum molding apparatus shown in FIG. 1, illustrating the acrylic sheet "skin" upon the completion of the molding operation.

FIG. 3 is a partial cross-sectional view of a completed article of the present invention after the simulated stone matrix and reenforcing glass fibers have been applied to the urethane coated acrylic "skin."

FIG. 4 is an enlarged fragmentary cross-sectional view of a portion of the article shown in FIG. 3.

DETAILED DESCRIPTION OF THE PREFERRED EMBODIMENTS

The material used in accordance with the present invention to form the acrylic "skin" of a simulated stone article or product having an integral acrylic resin surface is preferably a continuous cast cross-linked acrylic polymer such as "Swedcast 300" acrylic sheet manufactured by Novamont Corporation. However, other suitable acrylic or other polymer resin materials may be utilized.

Referring now to FIGS. 1 and 2, a typical vacuum molding apparatus is shown schematically for use in forming the acrylic sheet of the present invention into a "skin" 10. Of course, it will be recognized that other methods of forming such a "skin" can be utilized, such as blow molding or die molding, or the equivalent. In FIGS. 1 and 2, a thin sheet 10 of the selected acrylic resin is supported over a vacuum forming mold apparatus 15. For purposes of the present invention, thin sheets can be used to manufacture the article "skin" and are in fact preferred. While any suitable thickness can be utilized, it has been found that a sheet having a thickness of approximately 0.2 inches or less is preferable.

The mold apparatus 15 is shown mounted on a base 18 and having a sealing gasket 16 disposed about the bottom of the mold 15 to prevent air leakage around the bottom of the mold. A vacuum line 22 communicates with a vacuum manifold 24 located in the bottom of mold 15, and further communicates with a plurality of passages or apertures 19 that communicate between manifold 24 and the interior 17 of the mold. A suitable means for heating the sheet 10, such as a radiant heater 20, is employed to preheat the sheet to the appropriate molding temperature. Of course, other suitable means of preheating can also be used.

When the sheet 10 has reached the appropriate molding temperature, the air in vacuum manifold 24 is withdrawn through vacuum line 22 to apply a vacuum to manifold 24, thus drawing surface 14 of the preheated sheet 10 into conformity with the mold cavity 17. As the acrylic sheet 10 contacts the mold cavity 17, it cools until it is rigid enough to be lifted from the mold. The molded "skin" 10 is an actual configuration of the finished product, such as a shower stall, bathtub, lavatory or the like. Vacuum forming the "skin" 10 saves time, since the "skin" becomes a jig or mold for forming the simulated stone pattern of the finished product and becomes an integral part of the finished product, the acrylic "skin" 10 becoming a hard, scratch resistant surface for the product.

After cooling, the acrylic sheet "skin" 10 of the molded article is mounted on a jig having a base 30 and retaining clips 32 for holding the "skin" 10 in place during the additional steps of forming the completed simulated stone product. (See FIGS. 3 and 4).

The next step consists of washing and cleaning the surface 14 of "skin" 10 that is to receive the simulated stone material. It has been found that the best cleaning agent is an inert organic solvent such as methylene chloride, xylene or acetone which cleans and softens the surface 14 of "skin" 10 to make the surface more receptive to the bonding with the urethane coating layer. Of course, other suitable inert organic solvents may be utilized.

The cleaned surface 14 of "skin" 10 is then sprayed with a bond coating of urethane to form a urethane bonding layer 34. Since the polyester bonding resin used in the simulated marble matrix composition and the acrylic sheet do not have compatable bonding properties due to the shrinkage property of the resin, past attempts to bond the polyester resin simulated stone matrix composition directly to the acrylic sheet surface have not been successful. However, it has been found that the polyester bonding resin and the acrylic sheet will both bond exceptionally well to urethane with the addition of the exothermic reducing agent to the polyester resin composition as will be hereinafter more particularly described. There are a variety of urethanes available on the market and many can be used, but Sherwin-Williams Clear Polane was found and utilized with exceptional results.

The urethane bonding coat 34 should be sprayed evenly over the cleaned surface 14 of the acrylic "skin" 10, and is then allowed to "cure" or partially dry. The urethane drying time will vary depending on the temperature and humidity, but it was found that a four hour drying or curing time was about average.

To provide the simulated stone appearance of the final article, the acrylic "skin" 10 must be clear or substantially transparent in order that the patterning, veining and pigments can be readily seen through the acrylic sheet surface. To provide a simulated stone pattern or texture to the product, a composition 36 including a catalyzed polyester bonding resin and a simulated stone aggregate and exothermic reducing agent is evenly applied over the surface of the urethane layer 34 coating the preformed acrylic "skin" 10. The simulated stone composition is usually applied by pouring the material. While there are a large number of polyester bonding resins that are available and may be satisfactorily utilized, it has been found that Reichold Chemical Company's polyester resin 34-108 is a preferred bonding resin for the simulated stone matrix, although other Reichold formulations may be used.

In manufacturing a simulated marble product, the composition would include the catalyzed polyester bonding resin 33 (mentioned above), and the simulated stone aggregate 31 would include calcium carbonate and other mineral fillers such as marble chips, sand fines, silica flour and the like, which becomes a reinforcing material or matrix and provides the product with color, pattern, rigidity, strength and weight. A preferred composition for use in manufacturing a simulated marble product includes a catalyzed polyester bonding resin 33 comprising about 18%–20% by weight, a simulated stone aggregate 31 comprising calcium carbonate and other mineral fillers of about 80%–78% by weight, and about 2% by weight catalyst, titanium coloring agents, other inorganic pigments (to provide the the desire color, veining and marble pattern), and an exothermic reducing agent. It has been found that a 0.5% by weight methyl ethyl ketone peroxide is a suitable catalyst, but, of course, other appropriate catalysts could be utilized.

If the simulated stone article is to have an onyx appearance and pattern, then it has been found preferable to use a composition comprising the Reichold Chemical Company's polyester resin 34-108 (or other suitable polyester resin) of approximately 19%–20% by weight, a simulated stone aggregate including aluminum trihydrate and other mineral fillers of about 80%–79% by weight, and approximately 1% by weight catalyst, other coloring and pigmentation agents, and an exothermic reducing agent.

Of course, it should be understood that the above examples of the preferred compositions can be varied according to temperature, working conditions and/or desired colors and veining.

The exothermic reducing agent mentioned above is added to the simulated stone composition for slowing the curing time of the composition and in addition, lowers the temperature of the composition, further aiding in the slowing of the cure rate of the polyester bonding resin. It has been found that the use of the exothermic reducing agent for causing a slowing of the setting rate and lowering of the temperature of the polyester bonding resin permits greater flexing of the resin during shrinkage of the resin while curing. This action either retards the amount of shrinkage of the polyester bonding resin with respect to the urethane layer 34 coating the acrylic "skin" 10, or prolongs the curing time of the composition 36, thereby forming a stronger and more reliable bond with urethane layer 34 coating surface 14 of the acrylic "skin" 10 and prevents delamination problems. A simulated stone product is thus formed having a hard integral acrylic resin surface 12 that provides all of the beauty and advantages of a natural stone product. It has been found that a preferable exothermic reducing agent is a styrene derivative (alpha-methyl styrene) manufactured by the Reichold Chemical Company and identified as 34-851, but, of course, other suitable exothermic reducing agents could be used.

If the simulated stone matrix 36 is allowed to cure at room temperature, the curing time will normally run 2 to 6 hours, depending on the temperature and humidity. At 72° F. and 30% humidity, the curing time for the simulated stone matrix 36 would be approximately 2 hours. Utilizing the vacuum forming apparatus described above, an acrylic sheet "skin" 10 of the desired article could be formed and cooled, a urethane coating 34 applied and cured, and the simulated stone matrix 36 applied and cured in much less time than it ordinarily takes to manufacture such a product utilizing the time consuming manual techniques of the prior art.

Once the simulated stone composition 36 has sufficiently set or cured, a conventional reinforcing layer 38 comprising glass fibers 37 and a suitable polyester bonding resin 35, well known in the prior art, is applied to the exposed surface of the simulated stone matrix 36. The glass fiber reinforcing layer 38 is added to provide additional rigidity and flexibility to the product, and may be applied either manually or as is more common, by spraying the glass fibers 37 and polyester bonding resin 35 as a mixed composition directly onto the outer exposed surface of the simulated stone matrix 36. While the relative thickness of the applied matrix layer 36 and reenforcing layer 38 will vary depending upon the ultimate use of the simulated stone product, its use in lavatory products, tubs and shower stalls would typically be 3 to 5 times the thickness of the acrylic sheet "skin."

EXAMPLE

An acrylic sheet (Swedcast 300) having a thickness of 0.187 inches was vacuum formed into a bathtub configuration. The surface of the acrylic sheet was cleaned with an inert organic solvent (methylene chloride). A layer of a liquid urethane composition (Sherwin-Williams Clear Polane) was applied to the cleaned acrylic surface. The urethane was allowed to set for 4 hours.

A catalyzed polyester bonding resin-simulated stone matrix composition was mixed in a mechanical mixer and applied to the set urethane layer coating the surface of the acrylic "skin." The composition contained 18% by weight polyester bonding resin (Reichold Chemical Company resin 34-108), 80% by weight calcium carbonate, and other mineral fillers, ½% by weight methyl ethyl ketone peroxide as the catalyst, and 1.5% by weight titanium coloring agent and other inorganic pigments and alpha-methyl styrene as an exothermic reducing agent (Reichold Chemical Company product 34-851).

The simulated stone matrix composition was allowed to cure or set for about 30 minutes and then a polyester-glass fiber mixture was sprayed onto the exterior surface of the simulated stone matrix composition utilizing a conventional spray gun. The entire article was then left for additional curing, and after an additional 1½ to 2 hours the polyester bonding resins of both the simulated stone matrix layer, and the reinforcing glass fiber layer were cured and formed a quality simulated marble bathtub that was exceptionally strong, durable and resistant to delamination.

The acrylic "skin" 10 which becomes an integral part of the simulated stone product provides the product with several advantages. The acrylic skin covering the marble or onyx composition does not fade or yellow in direct sunlight as would the "gel coat" polyester resin surface of conventional simulated marble products. The polyester resin is subject to fading and yellowing in direct sunlight but he acrylic resin shields and filters ultra-violet rays from sunlight. In addition, the gel coat of conventionally made products is approximately 15 mils thick, while the acrylic sheet can generally range between 60 mils and 0.2 inches. The heavier acrylic "skin" helps create a "sandwich effect" that greatly enhances the strength and durability of the products.

Numerous variations and modifications may be made in the structure herein described without departing from the present invention. Accordingly, it should be clearly understood that the form of the invention herein described and shown in the figures of the accompanying drawings are illustrative only and not intended to limit the scope of the invention.

What is claimed is:

1. The method of forming a simulated stone product having an integral acrylic resin surface, comprising the steps of
    applying to the surface of a sheet of the acrylic resin an organic solvent for cleaning said surface and rendering said surface more receptive to bonding,
    applying to said surface a coating of liquid urethane,
    allowing said urethane to set for a preselected time period,
    applying to said urethane coating a composition including a catalyzed polyester bonding resin, a simulated stone aggregate, pigmenting agents, and an exothermic reducing agent, and
    curing said polyester bonding resin for bonding said resin to said urethane coating, said exothermic reducing agent causing a slowing of the setting rate and a lowering of the temperature of said resin for permitting greater flexing during shrinkage of said resin while curing.

2. The method as described in claim 1 wherein said curing step proceeds for a predetermined time period and further includes the additional steps of
    applying to the outer surface of said partially cured polyester bonding resin-simulated stone matrix composition a mixture of glass fibers and a curable polyester bonding resin for said fibers,
    continuing curing of said polyester bonding resin-simulated stone matrix composition for securely bonding said composition and the acrylic resin to said urethane coating, and
    curing said curable polyester bonding resin to securely bond said resin and glass fiber mixture to said composition for reinforcing said simulated stone product.

3. The method as described in claim 1, wherein said organic solvent is methylene chloride.

4. The method as described in claim 1, wherein said composition includes about 18 to 20% by weight polyester bonding resin, 80 to 78% by weight calcium carbonate, and other mineral fillers, and 2% by weight catalyst, pigmenting agents and said exothermic reducing agents.

5. The method as described in claim 1, wherein said composition includes about 19 to 20% by weight polyester bonding resin, 80 to 79% by weight aluminum tri-hydrate and other mineral fillers, 1% by weight catalyst, pigmenting agents, and exothermic reducing agent.

6. The method as described in claim 1, wherein said exothermic reducing agent is alpha-methyl styrene.

7. The method of forming a reinforced simulated stone product having an integral acrylic resin surface, comprising the steps of
    applying to the surface of a sheet of the acrylic resin an organic solvent for cleaning said surface and rendering said surface more receptive to bonding,
    applying to said surface a coating of liquid urethane,
    allowing said urethane to set for a preselected time period,
    applying to said urethane coating a composition including a catalyzed polyester bonding resin-simulated stone aggregate, pigmenting agents and an exothermic reducing agent,
    curing said polyester bonding resin for a predetermined time period for initially bonding said resin to said urethane coating, said exothermic reducing agent causing a slowing of the setting rate and a lowering of the temperature of said resin for permitting greater flexing during shrinkage of said resin while curing,
    applying to the outer surface of said catalyzed polyester bonding resin-simulated stone matrix composition a mixture of glass fibers and a curable polyester bonding resin for said fibers,
    continuing curing of said catalyzed polyester bonding resin-simulated stone matrix composition for securely bonding said composition and the acrylic resin surface to said urethane coating, and
    curing said curable polyester bonding resin to securely bond said resin and glass fiber mixture to said composition for reinforcing said simulated stone product.

8. The method as described in claim 7, wherein said organic solvent is methylene chloride.

9. The method as described in claim 7, wherein said catalyzed polyester bonding resin-simulated stone matrix includes about 18 to 20% by weight polyester bonding resin, 80 to 78% by weight calcium carbonate and other mineral fillers, and 2% by weight catalyst, pigmenting agents and said exothermic reducing agent.

10. The method as described in claim 7, wherein said catalyzed polyester bonding resin-simulated stone matrix includes about 19 to 20% by weight polyester bonding resin, 80 to 79% by weight aluminum tri-hydrate and other mineral fillers, and 1% by weight catalyst, pigmenting agents and said exothermic reducing agents.

11. The method as described in claim 7, wherein said exothermic reducing agent is alpha-methyl styrene.

12. A simulated stone article having an integral acrylic resin surface, comprising
    a formed sheet of an acrylic resin in the configuration of the article,
    a layer of partially set liquid urethane coating a surface of the acrylic sheet and molecularly bonded thereto,
    a cured composition of catalyzed polyester bonding resin and simulated stone aggregate molecularly bonded to the surface of the layer of urethane, said composition further including an exothermic reducing agent causing a slowing of the setting rate and a lowering of the temperature of said resin during curing for permitting greater flexing during shrinkage of said resin while curing to improve the bond between said resin and said urethane.

13. The article described in claim 12, further comprising
    glass fibers, and a cured polyester bonding resin molecularly bonded to said polyester bonding resin-simulated stone matrix composition for securely bonding said glass fibers thereto.

14. The article described in claim 12, wherein said composition when applied to said sheet includes about 18% to 20% by weight polyester bonding resin, 80% to 78% by weight calcium carbonate and other mineral fillers, and 2% by weight catalyst, pigmenting agents and said exothermic reducing agent.

15. The article as described in claim 12, wherein said catalyzed polyester bondng resin-simulated stone matrix when applied to said sheet includes about 19% to 20% by weight polyester bonding resin, 80% to 78% by weight aluminum tri-hydrate and other mineral fillers, and 1% by weight catalyst pigmenting agents and said exothermic reducing agent.

* * * * *